US010659272B2

(12) United States Patent
Dang et al.

(10) Patent No.: US 10,659,272 B2
(45) Date of Patent: May 19, 2020

(54) APPARATUS AND METHOD FOR RECEIVING AND SENDING ENDS OF WIRELESS COMMUNICATION SYSTEM, AND SOFT INFORMATION ESTIMATOR

(71) Applicants: Jian Dang, Jiangsu (CN); Jianqing Dou, Jiangsu (CN); Yu Shi, Jiangsu (CN); Zaichen Zhang, Jiangsu (CN); Liang Wu, Jiangsu (CN); Penshun Lu, Beijing (CN)

(72) Inventors: Jian Dang, Jiangsu (CN); Jianqing Dou, Jiangsu (CN); Yu Shi, Jiangsu (CN); Zaichen Zhang, Jiangsu (CN); Liang Wu, Jiangsu (CN); Penshun Lu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/092,810

(22) PCT Filed: Apr. 6, 2017

(86) PCT No.: PCT/CN2017/079525
§ 371 (c)(1),
(2) Date: Oct. 11, 2018

(87) PCT Pub. No.: WO2017/177855
PCT Pub. Date: Oct. 19, 2017

(65) Prior Publication Data
US 2019/0165976 A1 May 30, 2019

(30) Foreign Application Priority Data
Apr. 15, 2016 (CN) .......................... 2016 1 0237386

(51) Int. Cl.
*H04L 27/26* (2006.01)
*H04L 1/00* (2006.01)
(Continued)

(52) U.S. Cl.
CPC .............. *H04L 27/264* (2013.01); *H04L 1/00* (2013.01); *H04L 25/0202* (2013.01);
(Continued)

(58) Field of Classification Search
CPC .............. H04L 27/264; H04L 25/0202; H04L 25/03318; H04L 27/2605
See application file for complete search history.

(56) References Cited

U.S. PATENT DOCUMENTS

2011/0044409 A1\* 2/2011 Yoshimoto ............. H04J 11/004
375/340
2015/0264668 A1\* 9/2015 Takehana ............. H04W 72/04
370/329
(Continued)

FOREIGN PATENT DOCUMENTS

CN 101437007 A 5/2009
CN 101442389 A 5/2009
(Continued)

OTHER PUBLICATIONS (V. Berg, J-B. Dore, D. Noguet, "A flexible radio transceiver for TVWS based on FBMC," Microprocessors and Microsystems Journal (MICPRO), 2014 (Year: 2014).\*
(Continued)

*Primary Examiner* — Jaison Joseph
(74) *Attorney, Agent, or Firm* — Xsensus LLP

(57) ABSTRACT

Provided are an apparatus and method for a sending end and a receiving end of a wireless communication system, and a soft information estimator. The apparatus for the sending end of the wireless communication system comprises: an interleave division multiple access unit configured to perform interleave processing on information to be sent; and a filter bank multi-carrier unit configured to use a specific
(Continued)

sub-carrier chosen in advance to transmit the interleaved information in a parallel manner.

17 Claims, 11 Drawing Sheets

(51) Int. Cl.
    *H04L 25/06*     (2006.01)
    *H04L 25/02*     (2006.01)
    *H04L 25/03*     (2006.01)

(52) U.S. Cl.
    CPC ...... *H04L 25/03318* (2013.01); *H04L 25/067* (2013.01); *H04L 27/2605* (2013.01); *H04L 25/0224* (2013.01)

(56) References Cited

U.S. PATENT DOCUMENTS

| | | | | |
|---|---|---|---|---|
| 2015/0381318 A1* | 12/2015 | Zhang | .................. | H04L 1/0071 370/335 |
| 2016/0014790 A1* | 1/2016 | Takehana | ............ | H04W 72/085 370/329 |
| 2016/0029235 A1 | 1/2016 | Kim et al. | | |
| 2016/0211999 A1* | 7/2016 | Wild | .................... | H04L 27/264 |
| 2017/0156131 A1* | 6/2017 | Kimura | .................... | H04J 11/00 |
| 2017/0170950 A1* | 6/2017 | Kim | ....................... | H04L 7/0016 |
| 2017/0230138 A1* | 8/2017 | Xiong | .................. | H04L 1/0003 |
| 2017/0244428 A1* | 8/2017 | Kimura | .................... | H04L 1/00 |
| 2019/0141545 A1* | 5/2019 | Dang | ................. | H04L 25/0204 |

FOREIGN PATENT DOCUMENTS

| | | |
|---|---|---|
| CN | 105306118 A | 2/2016 |
| CN | 105450577 A | 3/2016 |

OTHER PUBLICATIONS

Wu, H. et al. "User-specific Chip-level Interleaver Design for IDMA Systems", Electronics Letters, vol. 42, No. 4, Feb. 16, 2006, pp. 1-2.

English-language translation of International Search Report and Written Opinion for International Application No. PCT/CN2017/079525 dated Jun. 30, 2017.

* cited by examiner

APPARATUS AND METHOD FOR RECEIVING AND SENDING ENDS OF WIRELESS COMMUNICATION SYSTEM, AND SOFT INFORMATION ESTIMATOR

This application claims a priority to Chinese Patent Application No. 201610237386.7, titled "APPARATUS AND METHOD FOR RECEIVING AND TRANSMITTING ENDS OF WIRELESS COMMUNICATION SYSTEM, AND SOFT INFORMATION ESTIMATOR", and filed with the Chinese State Intellectual Property Office on Apr. 15, 2016, which is incorporated herein by reference in its entirety.

FIELD OF THE INVENTION

The embodiments of present disclosure generally relate to the field of wireless communications, particularly to hybrid multiple access technology, and more particularly to an apparatus and a method for a transmitting end and a receiving end of a wireless communication system, and a soft information estimator.

BACKGROUND OF THE INVENTION

Hybrid multiple access (HMA) technology has a wide application prospect. As compared with other onefold multiple access technology such as frequency division multiple access (FDMA), orthogonal frequency division multiple access (OFDMA), code division multiple access (CDMA) and interleave division multiple access (IDMA), the HMA technology has a layered structure, and combines advantages of technologies used in all layers. Therefore, it is expected to apply the HMA technology to the next-generation wireless communication system due to advantages of the HMA technology such as high quality of service and high anti-interference ability.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

An apparatus for a transmitting end of a wireless communication system is provided according to an aspect of the present disclosure, which includes: an interleave division multiple access unit, configured to perform interleaving processing on information to be transmitted; and a filter bank multi-carrier unit, configured to transmit the interleaved information in parallel using particular pre-selected sub-carriers.

An apparatus for a receiving end of a wireless communication system is provided according to another aspect of the present disclosure, which includes: a soft information estimator, configured to calculate, based on received data and apriori statistical information of a real part and an imaginary part of each group of code chip for each user, external soft information of the real part and the imaginary part of the code chip respectively, wherein the apriori statistical information is acquired based on apriori soft information of the code chip, and an initial value of the apriori soft information is zero; an updating unit, configured to update, based on the external soft information, the apriori soft information corresponding to the code chip of the user, calculate, based on the updated apriori soft information, the apriori statistical information corresponding to the code chip of the user, and provide the calculated apriori statistical information to the soft information estimator to update the apriori statistical information; an iteration control unit, configured to control the soft information estimator and the updating unit to perform iteration operations, until a predetermined condition is met; and a decision unit, configured to perform hard decision based on the external soft information of the code chip in a case that the predetermined condition is met.

A soft information estimator is provided according to another aspect of the present disclosure. The soft information estimator is configured to calculate, based on received data and apriori statistical information of a real part and an imaginary part of each group of code chip for each user, external soft information of the real part and the imaginary part of the code chip respectively. The apriori statistical information is acquired based on apriori soft information of the code chip, and an initial value of the apriori soft information is zero.

A method for a transmitting end of a wireless communication system is provided according to another aspect of the present disclosure. The method includes: performing interleaving processing on information to be transmitted; and transmitting the interleaved information in parallel using particular pre-selected sub-carriers.

A method for a receiving end of a wireless communication system is provided according to another aspect of the present disclosure, which includes: calculating, based on received data and apriori statistical information of a real part and an imaginary part of each group of code chip for each user, external soft information of the real part and the imaginary part of the code chip respectively, wherein the apriori statistical information is acquired based on apriori soft information of the code chip, and an initial value of the apriori soft information is zero; updating, based on the external soft information, the apriori soft information corresponding to the code chip of the user, and calculating, based on the updated apriori soft information, the apriori statistical information corresponding to the code chip of the user; iterating the above processing until a predetermined condition is met; and performing hard decision based on the external soft information of the code chip in a case that the predetermined condition is met.

In the apparatus and the method for the transmitting end and the receiving end of the wireless communication system according to the embodiments of the present disclosure, filter bank multi-carrier technology and interleave division multiple access technology are combined to implement new hybrid multiple access technology, thereby effectively extending system capacity and improving system performance. On the other hand, the soft information estimator according to the embodiment of the present disclosure can be applied to soft information estimation of signals in various modulation formats.

According to other aspects of the present disclosure, there are further provided computer program codes and computer program products for implementing methods for a transmitting end and a receiving end of a wireless communication system and methods for estimating soft information, and a computer readable storage medium on which the computer program codes for implementing the methods is recorded.

These and other advantages of the present disclosure will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

First Embodiment

In interleave division multiple access (IDMA) which is complete non-orthogonal multiple access technology, independent interleavers are used to distinguish users, thereby reducing requirements on a spreading spectrum code. A spectrum may be spread through encoding, and a maximized encoding gain is obtained. Therefore, spectrum efficiency can be raised by improving channel encoding. In addition, since spectrum spreading may be combined with the channel encoding, a bandwidth used by the spreading spectrum code is used for the channel encoding, thereby further reducing a code rate, maximizing the encoding gain, and effectively enlarging the system capacity. However, an iterative interference cancellation manner is used for cancelling interference of the multipath channel at a receiving end of the IDMA, which is complex. Therefore, the IDMA may be combined with multi-carrier technology having a good performance for resisting multipath and low complexity.

Figure 1:
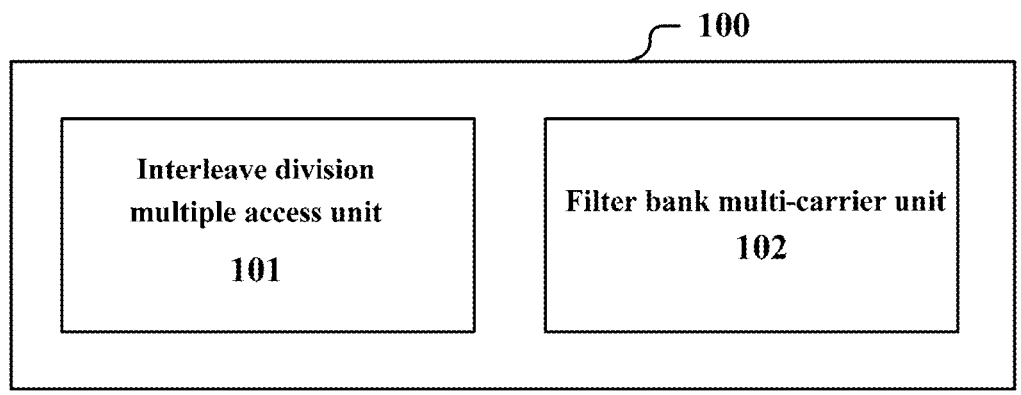
FIG. 1 is a structural block diagram of an apparatus for a transmitting end of a wireless communication system according to an embodiment of the present disclosure.

Filter bank multi-carrier (FBMC) technology is used in the embodiment. FIG. 1 is a structural block diagram of an apparatus 100 for a transmitting end of a wireless communication system according to an embodiment of the present disclosure. The apparatus 100 includes: an interleave division multiple access unit 101, configured to perform interleave processing on information to be transmitted; and a filter bank multi-carrier unit 102, configured to transmit the interleaved information in parallel using particular preselected sub-carriers.

The interleave division multiple access unit 101 may be implemented by any existing interleaver. Different interleavers are used by different users respectively, and the system may use the interleaver as a unique identifier for distinguishing the users. Then, the filter bank multi-carrier unit 102 filters interleaved data of each of the users. For example, each of filters in a filter bank used in the filter bank multi-carrier unit 102 corresponds to a sub-carrier. The filter bank multi-carrier unit 102 transmits data on a sub-carrier by selecting a filter corresponding to the sub-carrier. The same data or different data may be transmitted on the sub-carriers. Alternatively, a part of data transmitted on the sub-carriers may be the same with each other. In the apparatus 100, the same sub-carrier may be used by different users to transmit data. That is, one sub-carrier may be allocated to multiple users to be used simultaneously, thereby improving system capacity.

The FBMC has good anti-carrier-frequency-offset performance, a requirement for synchronization of the transmitted data is low, and it is easy to implement simple carrier aggregation. Therefore, a hybrid division multiple access system obtained by combining the FBMC and the IDMA can resist external frequency offset interference better, thereby achieving good system performance.

Figure 2:
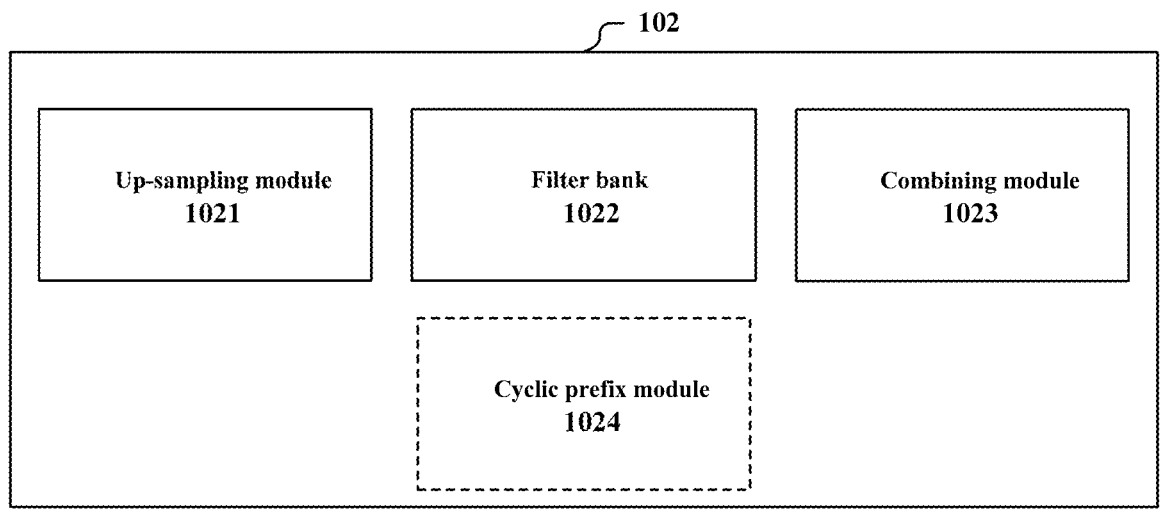
FIG. 2 is a schematic structural block diagram of a filter bank multi-carrier unit in FIG. 1.

In an example, as shown in FIG. 2, the filter bank multi-carrier unit 102 may include an up-sampling unit 1021, a filter bank 1022 and a combining module 1023. The up-sampling unit 1021 is configured to perform up-sampling on the interleaved information. The filter bank 1022 includes multiple filters, each of which corresponds to a sub-carrier. The up-sampled user information is inputted to one or more filters corresponding to particular preselected sub-carriers. The combining module 1023 is configured to combine output of the one or more filters for transmitting.

Figure 3:
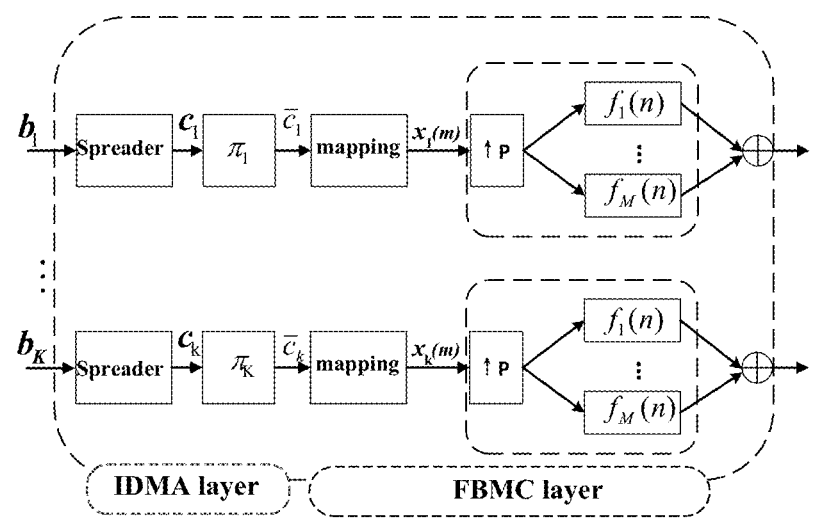
FIG. 3 is a schematic diagram showing interleave division multiple processing and filter bank multi-carrier processing performed on K users respectively by a transmitting end.

For convenience of description, FIG. 3 shows a schematic diagram showing interleave division multiple processing and filter bank multi-carrier processing performed on K users respectively by a transmitting end. As shown in FIG. 3, a bit vector $b_k$ (the bit vector $b_k$ may be encoded or not) of transmitting information of a k-th user is inputted to a spreader to be spread, to acquire a spread code chip vector $c_k$. A spreading sequence may be for example an alternate sequence of $\{+1, -1\}$. Then, $c_k$ is interleaved by an interleaver $\pi_k$, to acquire an interleaved code chip vector $\bar{c}_k$. As described above, K users must correspond to interleavers different from each other, so that the system can distinguish the K users. Next, symbol mapping is performed on $\bar{c}_k$, to acquire a data stream $x_k$ (m), k=1, 2, . . . , K. The symbol mapping here may be BPSK, QPSK, QAM or the like. The up-sampling module 1021 performs up-sampling with a sampling factor of P on each data stream, and the up-sampled data stream is inputted to one or more preselected filters, for synchronous filtering. The combining module 1023 combines output of the one or more filters to acquire output data of each user. Finally, the output data of the K users is transmitted to a receiving end (not shown in FIG. 3) through a multiple access channel (MAC).

Figure 4:
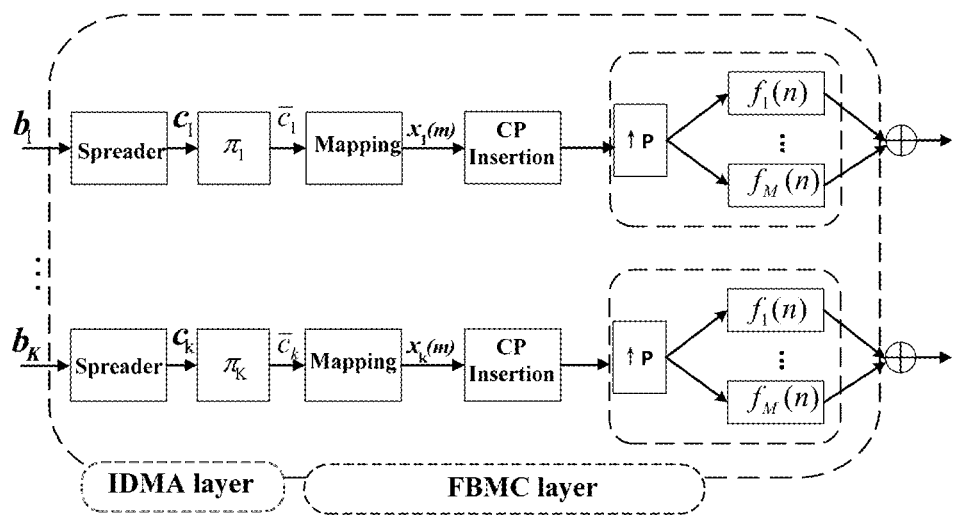
FIG. 4 is another schematic diagram showing interleave division multiple processing and filter bank multi-carrier processing respectively performed on K users by a transmitting end.

In addition, as shown by a dashed line block in FIG. 2, the filter bank multi-carrier unit 102 may further include a cyclic prefix module 1024. The cyclic prefix module 1024 is configured to insert a cyclic prefix into the interleaved information before up-sampling is performed on the interleaved information. For example, the cyclic prefix is inserted into the interleaved information to improve communication quality, so that the interleaved information may be used in a situation of low channel quality. Similar to FIG. 3, FIG. 4 is a schematic diagram showing processing performed at the transmitting end in a case that the cyclic prefix is inserted. It can be seen that processing of inserting the cyclic prefix is performed between the mapping and the up-sampling.

Figure 5:
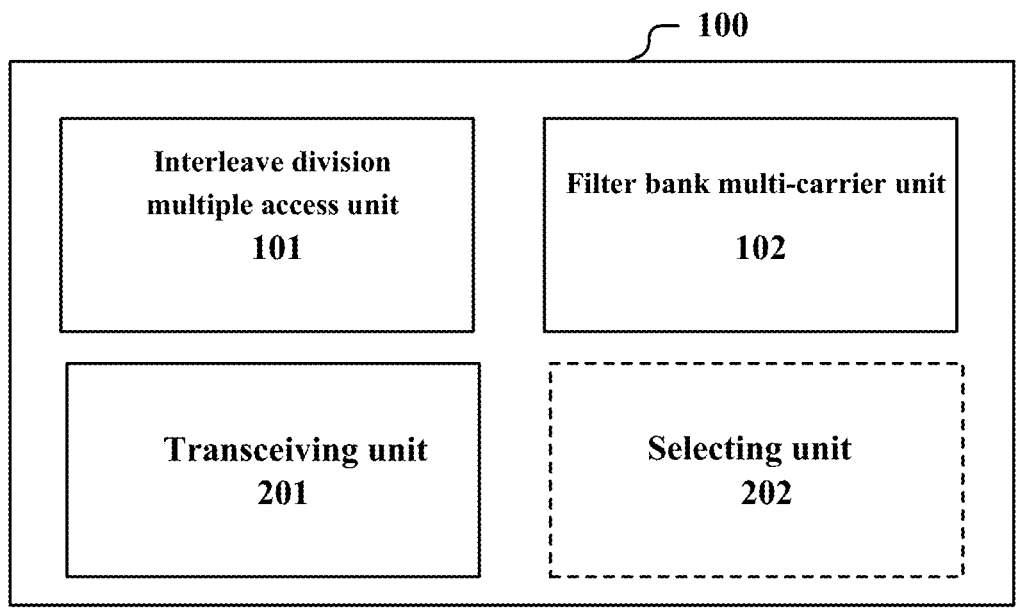
FIG. 5 is another structural block diagram of an apparatus for a transmitting end of a wireless communication system according to an embodiment of the present disclosure.

In an example, the transmitting end is user equipment. As shown in FIG. 5, the apparatus 100 may further include a transceiving unit 201. The transceiving unit 201 is configured to receive information, from a base station, information as to whether a cyclic prefix is to be used and/or information about the number N of the sub-carriers to be selected. In the example, the base station determines, based on factors such as channel quality, a quality of service requirement and the number of active users (that is, the number of user equipment in a connection state), whether to use a cyclic prefix and the number N of the sub-carriers to be used by the user equipment. For example, the cyclic prefix may be used in a case that the channel quality is poor or the quality of service requirement is high. A large N may be set in a case that the quality of service requirement is high and the number of active users is small.

As shown by a dashed line block in FIG. 5, the apparatus 100 may further include a selecting unit 202, configured to randomly select N sub-carriers as particular sub-carriers. Various appropriate random selection algorithms may be used.

In addition, the transceiving unit 201 may be further configured to receive, from the base station, information related to a data length and the filter bank, so that the user equipment performs data packeting and filter generation based on the related information. For example, upon receiving a data transmission request from the user equipment, the base station generates parameter setting on data and sub-carriers which includes for example a parameter on a data length, a parameter on the filter bank and the like, and transmits the parameter setting to the user equipment in a data transmission response. By transmitting the parameters, it can be ensured that both the transmitting end and the receiving end have the same understanding on the data packets and the filter parameters.

Figure 6:
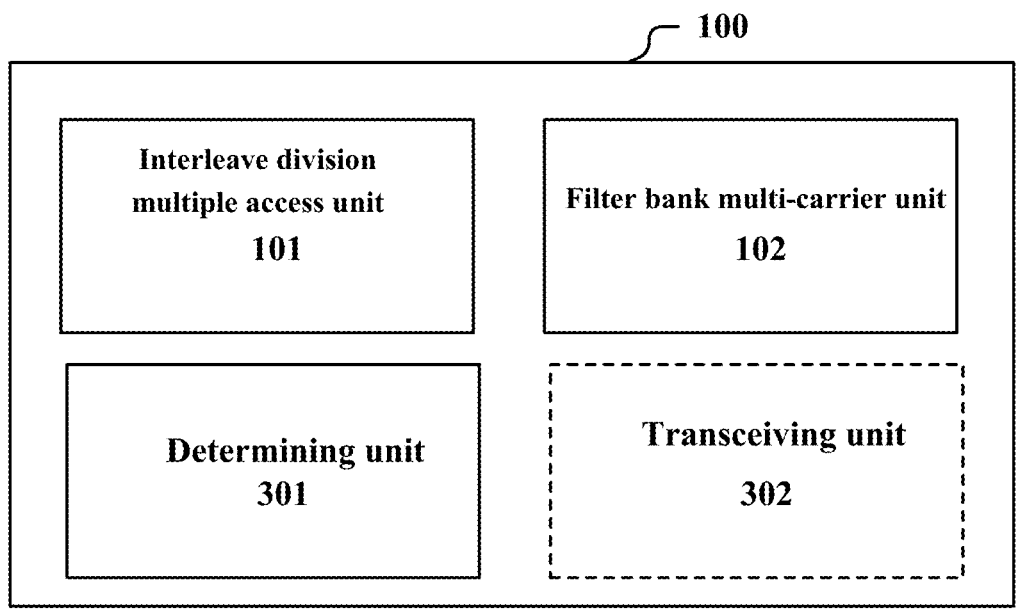
FIG. 6 is another structural block diagram of an apparatus for a transmitting end of a wireless communication system according to an embodiment of the present disclosure.

In another example, the transmitting end is a base station. As shown in FIG. 6, the apparatus 100 may further include a determining unit 301. The determining unit 301 is configured to determine, based on a result of channel estimation, whether to use a cyclic prefix and the number of sub-carriers to be used by the user equipment. The base station may perform channel estimation using a training sequence received from the user equipment.

As shown by a dashed line block in FIG. 6, the apparatus 100 may further include a transceiving unit 302. The transceiving unit 302 is configured to: receive a training sequence and a quality of service requirement from the user equipment, so that the base station performs channel estimation based on the training sequence and the quality of service requirement; and transmits to the user equipment, information as to whether to use a cyclic prefix and/or the number of sub-carriers to be used by the user equipment.

In addition, the transceiving unit 302 may be further configured to transmit information related to a data length and the filter bank to the user equipment upon receiving a data transmission request from the user equipment. As described above, the user equipment may package data to be transmitted and generate filters in the filter bank, based on the related information. In an example, the information related to the filter bank includes at least one of the number of sub-carriers, the length of the filter, a center frequency and a bandwidth. It should be understood that the parameter is only exemplary and is not limited thereto.

Figure 7:
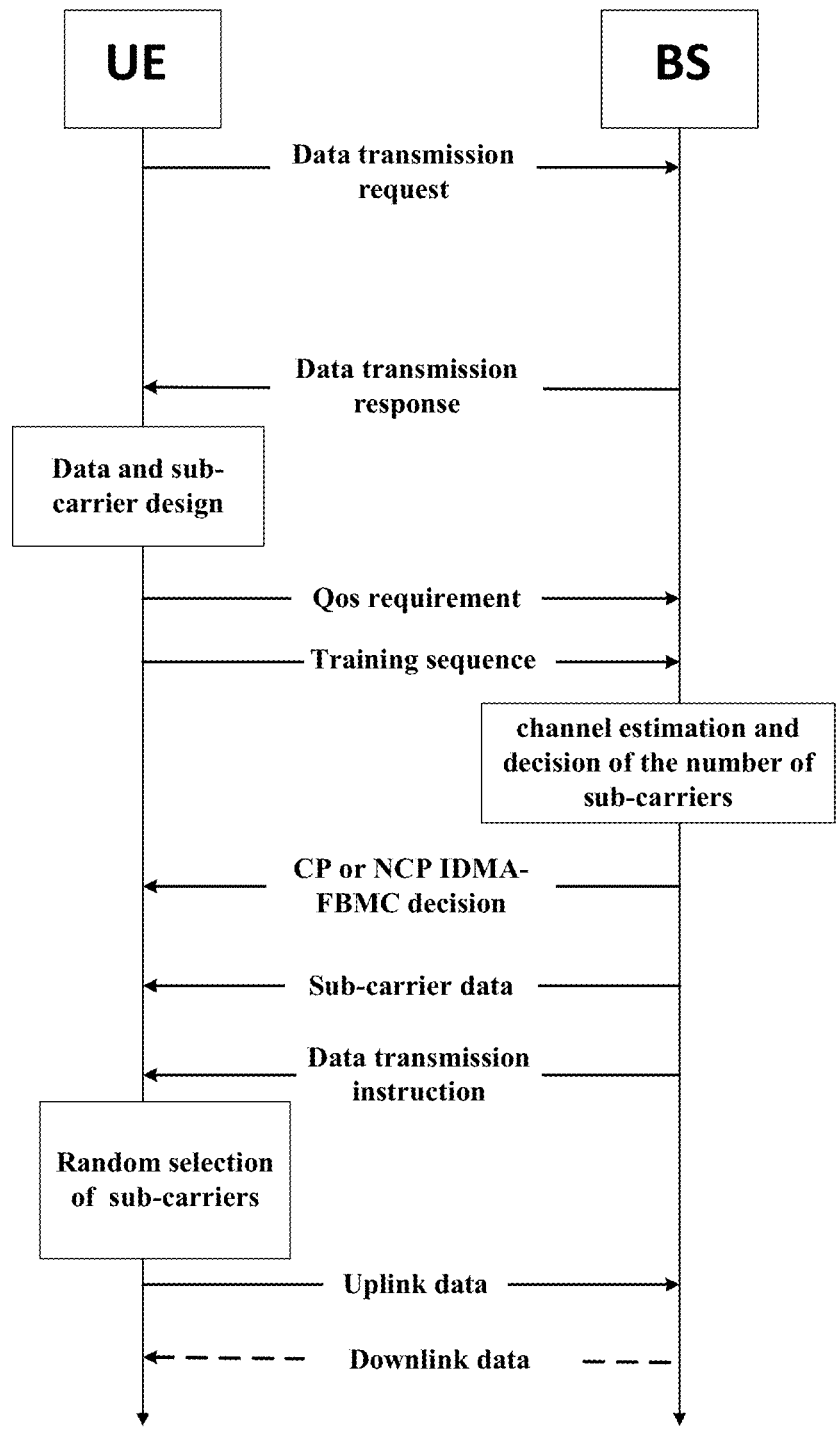
FIG. 7 is a diagram showing an example of an information procedure between a base station and user equipment in a wireless communication system according to an embodiment of the present disclosure.

The user equipment (UE) and the base station (BS) including the above apparatus 100 constitute a wireless communication system based on filter bank multi-carrier interleave division multiple access (FBMC-IDMA). For convenience of understanding, FIG. 7 shows an example of an information procedure between the base station and the user equipment in the wireless communication system. In the example, a time division duplex uplink data transmission system is taken as an example for description.

As shown in FIG. 7, the UE first transmits a data transmission request to the BS. Upon receiving the data transmission request, the BS detects whether it is suitable to perform communication in an ambient environment, and generates parameter settings on a data length and sub-carriers in response to the data transmission request in a case that it is suitable to perform communication in an ambient environment, and transmits the parameter settings to the UE in a data transmission response. The UE performs data packeting and filter generation based on the received parameter settings on the data length and the sub-carriers. A way of data packeting and the parameters of the filter are agreed by both the UE and the BS.

Next, the UE transmits a quality of service (QoS) requirement and a training sequence to the BS. The BS performs channel estimation based on the received training sequence, and determines a channel state based on a result of the channel estimation, to determine to use cyclic prefix (CP) IDMA-FBMC or non-cyclic prefix (NCP) IDMA-FBMC. For example, the NCP IDMA-FBMC may be used if the channel state is good, and the CP IDMA-FBMC is used if the channel state is bad. The BS may further determine the minimum CP length $N_c=(N_f+L-1)$ P, where $N_f$ represents a length of the filter, L represents a channel length, and P represents an up-sampling ratio. Then, the BS determines, based on information on the channel state obtained by the channel estimation, the number of active users, the QoS requirement and the like, the number of sub-carriers to be allocated to the UE.

Subsequently, the BS transmits a decision on whether to use CP, information on the number of sub-carriers and a data transmission instruction to the UE. Upon receiving the data transmission instruction, the UE randomly selects sub-carriers based on the received number of sub-carriers, that is, the UE selects filters in the filter bank corresponding to the sub-carriers, to transmit uplink data in parallel on the selected sub-carriers. The BS receives the data with a corresponding receiving method, and may also transmit downlink data if necessary.

In the above signaling interaction process, data volume of most of signaling data is small, and the signaling data may be transmitted through a control channel. Only the data volume of the training sequence and the data block is large, and the training sequence and the data block are transmitted through a data channel.

In the embodiment, in the hybrid multiple access system obtained by combining the FBMC and the IDMA, not only external frequency offset interference can be resisted better to implement a good system performance, but also only a part of filters in the filter bank may be used, and the same sub-carrier may be allocated to different user equipment to be used simultaneously, thereby improving system capacity and configuration flexibility.

Second Embodiment

Figure 8:
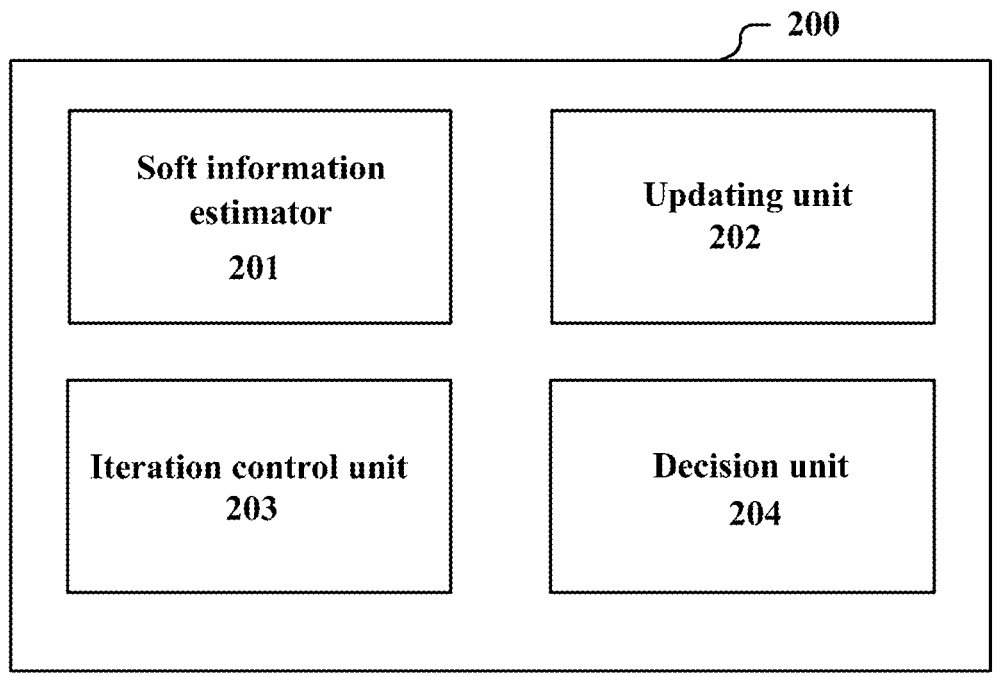
FIG. 8 is a structural block diagram of an apparatus for a receiving end of a wireless communication system according to an embodiment of the present disclosure.

FIG. 8 is a structural block diagram of an apparatus 200 for a receiving end of a wireless communication system according to an embodiment of the present disclosure, the apparatus 200 includes a soft information estimator 201, an updating unit 202, an iteration control unit 203 and a decision unit 204. The soft information estimator 201 is configured to calculate, based on received data and apriori statistical information of a real part and an imaginary part of each group of code chip for each user, external soft information of the real part and the imaginary part of the code chip respectively. The apriori statistical information is acquired based on apriori soft information of the code chip, and an initial value of the apriori soft information is 0. The updating unit 202 is configured to update, based on the external soft information, the apriori soft information corresponding to the code chip of the user, calculate, based on the updated apriori soft information, the apriori statistical information corresponding to the code chip of the user, and provide the calculated apriori statistical information to the soft information estimator 201 to update the above apriori statistical information. The iteration control unit 203 is configured to control the soft information estimator 201 and the updating unit 202 to perform iteration operations, until a predetermined condition is met. The decision unit 204 is configured to perform hard decision based on the external soft information of the code chip in a case that the predetermined condition is met.

The receiving end in the embodiment may be configured to for example receive data transmitted by the transmitting end of the apparatus 100 according to the first embodiment. In the apparatus 200, the received signal is inputted into the soft information estimator 201. The soft information estimator 201 divides the received data obtained by synthesizing data of multiple users into data streams corresponding to the users through code chip-level interference cancellation. In addition, the apparatus 200 processes a real part and an imaginary part of the received signal, respectively.

A structure of the apparatus 200 is described below with an example where the received signal is a signal transmitted from the transmitting end shown in FIG. 3 and passing through the MAC. However, it should be understood that the signal which can be received by the apparatus 200 is not limited thereto, and the description here is only for convenience.

Figure 9:
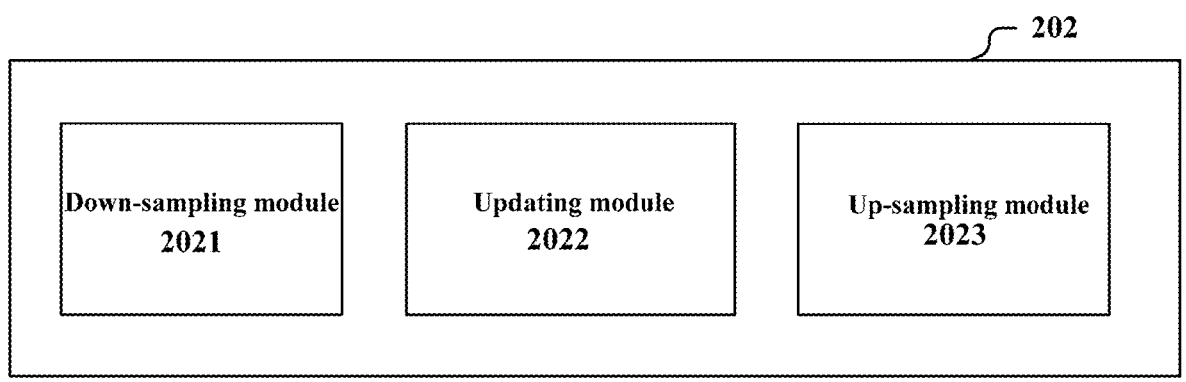
FIG. 9 is a schematic structural block diagram of an updating unit in FIG. 8.

Exemplarily, as shown in FIG. 9, the updating unit 202 may include a down-sampling module 2021, an updating module 2022 and an up-sampling module 2023. The down-sampling module 2021 is configured to perform down-sampling on the external soft information to acquire second external soft information of a data stream corresponding to the user. The updating module 2022 is configured to update the apriori soft information of the data stream corresponding to the user using the second external soft information, and calculates the apriori statistical information of the data stream corresponding to the user based on the updated apriori soft information. The up-sampling module 2023 is configured to perform up-sampling on the updated apriori statistical information, to acquire apriori statistical information of the code chip. The second external soft information here is only used to be distinguished from the external soft information of the code chip, and means no sequence. Since the up-sampling is performed at the transmitting end, corresponding down-sampling is required to be performed at the receiving end to acquire related parameters or information of the corresponding data stream.

In an example, non-cyclic prefix filter bank multi-carrier interleave division multiple access (NCP FBMC-IDMA) technology is used. The transmitting end includes the apparatus 100 according to the first embodiment, the receiving end includes the apparatus 200 according to the embodiment, and a multiple access channel is used between the transmitting end and the receiving end. As described above, a chip-by-chip detection algorithm is used in the apparatus 200.

Figure 10:
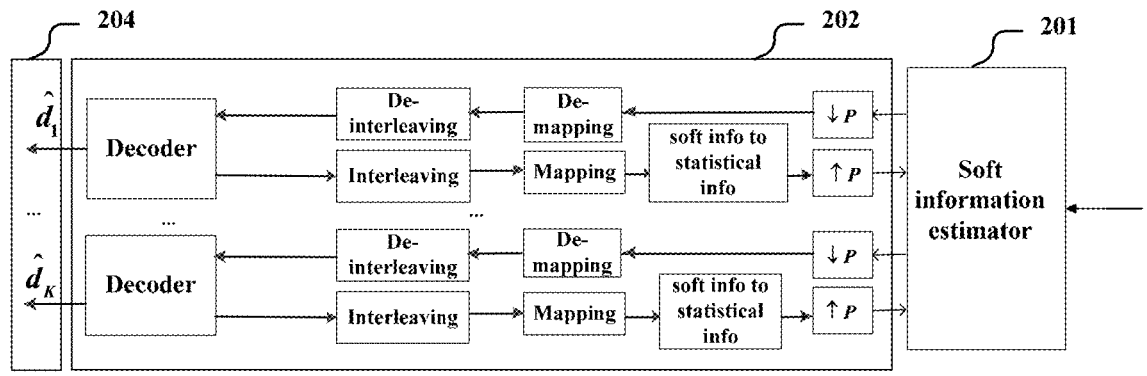
FIG. 10 is a schematic diagram showing receiving processing performed by a receiving end.

FIG. 10 is a schematic diagram showing receiving processing in the example. The units in the apparatus 200 are described in detail below with reference to FIG. 10. As shown in FIG. 10, the soft information estimator 201 calculates, based on received data and apriori statistical information of each group of code chip for each user, external soft information of the real part and the imaginary part of the code chip respectively. It should be noted that since processing on the real part is the same as processing on the imaginary part, whether the following description is for the real part or the imaginary part is not indicated in particular, and the following description is applicable to both the real part and the imaginary part. In this way, the soft information estimator 201 may be applicable for a signal in various modulation formats, which includes but is not limited to BPSK, QPSK, QAM or the like. The external soft information represents a probability that the received signal is determined as a certain transmitting value.

Next, the updating unit 202 updates the apriori statistical information based on the calculated external soft information, and provides the updated apriori statistical information to the soft information estimator, to perform an iteration operation until a predetermined condition is met. The predetermined condition may refer to for example that a predetermined number of iterations is reached. Processing performed by the updating unit 202 is shown by a block in FIG. 10. In a case that the predetermined condition is met, the decision unit 204 performs hard decision based on the external soft information of the code chip. For example, the decision unit 204 performs hard decision on output of the decoder at this time, to acquire an estimated sequence $\hat{d}_1, \ldots, \hat{d}_k$.

For example, after a signal is transmitted through an MAC, the received signal r may be represented as follows.

$$r = \sum_{k=1}^{K} H_k \tilde{x}_k + \xi, \quad (1)$$

where $r=[r(1),r(2),\ldots,r(N)]^T$ (2)

$\tilde{x}_k=[\tilde{x}_k(1),\tilde{x}_k(2),\ldots,\tilde{x}_k(N)]^T$ (3)

$\xi=[\xi(1),\xi(2),\ldots,\xi(N)]^T$ (4)

$$H_k = \begin{bmatrix} h_{eq,k}(1) & 0 & \ldots & 0 & 0 & \ldots & 0 \\ h_{eq,k}(2) & h_{eq,k}(1) & \ldots & 0 & & \ldots & 0 \\ \vdots & \vdots & \ddots & 0 & \vdots & \ddots & \vdots \\ h_{eq,k}(l) & h_{eq,k}(l-1) & \ldots & 0 & 0 & \ldots & 0 \\ \vdots & \vdots & \ddots & \ldots & & \ddots & \vdots \\ 0 & 0 & \ldots & h_{eq,k}(l) & h_{eq,k}(l-1) & \ldots & h_{eq,k}(1) \end{bmatrix} \quad (5)$$

where N represents a length of the code chip, and is a natural number, r(j) represents each received symbol data, $\{\tilde{x}_k(j)\}$ represents up-sampled data of $\{x_k(m)\}$, $\xi(j)$ represents additive white Gaussian noise (AWGN), $h_{eq,k}(l)$ represents an equivalent channel synthesized by all sub-carriers selected by the k-th user and multiple access channel (MAC) of the k-th user, $H_k$ represents a Toeplitz matrix of N×N composed of $h_{eq,k}(l)$ as a first column.

The formula (1) may be written as:

$$r = H_k \tilde{x}_k + \xi_k, \quad (6)$$

$$\xi_k \equiv r - H_k \tilde{x}_k = \sum_{k' \neq k} H_{k'} \cdot \tilde{x}_{k'} + \xi \quad (7)$$

where $\xi_k$ represents interference (which includes noise and is referred to as a sum of noise and interference hereinafter) corresponding to the k-th user. $\xi_k$ may be approximately represented as a Gaussian variable according to the central limit theorem, and a probability density function (PDF) of the Gaussian variable is determined by its mean value and variance.

In the example, the apriori statistical information includes a mean value and variance, and the soft information estimator 201 calculates, based on the mean value and the variance of the code chip, a mean value matrix and a covariance matrix of a sum of noise and interference, to acquire external soft information of the code chip.

In an example, the soft information estimator 201 may calculate the above external soft information according to a formula as follows.

$$e_{ESE}(\tilde{x}_k)=2H_k^H(\text{Cov}(\xi_k))^{-1}(r-E(\xi_k)) \quad (8)$$

where $e_{ESE}(\tilde{x}_k)$ represents the acquired external soft information, and $$E(\xi_k)=E(r)-H_k E(\tilde{x}_k) \quad (9)$$

$$\text{Cov}(\xi_k)=\text{Cov}(r)-H_k \text{Cov}(\tilde{x}_k)H_k^H \quad (10)$$

Cov(r) represents a covariance matrix of the received data, a superscript H represents a conjugate transpose operation, Cov($\xi_k$) represents a covariance matrix of the sum of noise and interference of the k-th user, and a superscript −1 represents a matrix inverse operation, $E(\tilde{x}_k)$ represents a mean value of a vector $\tilde{x}_k$, and represents a mean vector of the code chip composed of mean values of the code chip, Cov($\tilde{x}_k$) represents a covariance matrix of the vector $\tilde{x}_k$, and represents a covariance matrix of the code chip composed by taking variance of the code chip as a diagonal element. $E(\tilde{x}_k)$ and Cov($\tilde{x}^k$) may be calculated with the following (11) and (12) respectively.

$$E(\tilde{x}_k)=[E(\tilde{x}_k(1)),E(\tilde{x}_k(2)),\ldots,E(\tilde{x}_k(N))]^T \quad (11)$$

$$\text{Cov}(\tilde{x}_k)=\text{diag}\{\text{Var}(\tilde{x}_k(1)),\text{Var}(\tilde{x}_k(2)),\ldots,\text{Var}(\tilde{x}_k(N))\} \quad (12)$$

where $E(\tilde{x}_k(j))$ and $Var(\tilde{x}_k(j))$ represent a mean value and variance of the code chip, and may be acquired by up-sampling the mean value and the variance of the data stream $x_k(m)$ through the up-sampling module 2023, as shown below.

$$E(\tilde{x}_k(j))=(E(x_k(m)))_{\uparrow P} \quad (13)$$

$$Var(\tilde{x}_k(j))=(Var(x_k(m)))_{\uparrow P} \quad (14)$$

where $\uparrow P$ represents up-sampling with an up-sampling factor of P. For example, the mean value and the variance of the data stream may be calculated by the updating module 2022 according to a formula as follows.

$$E(x_k(m))=\text{Re}(E(x_k(m)))+j\text{Im}(E(x_k(m)))=E(\text{Re}(x_k(m)))+jE(\text{Im}(x_k(m))) \quad (15)$$

where $E(\text{Re}(x_k(m)))=\tan h(e_{DEC}(\text{Re}(x_k(m)))/2)$, $E(\text{Im}(x_k(m)))=\tan h(e_{DE}(\text{Im}(x_k(m)))/2)$, and $$\text{Var}(x_k(m))=\text{Re}(\text{Var}(x_k(m)))+j\text{Im}(\text{Var}(x_k(m)))=\text{Var}(\text{Re}(x_k(m)))+j\text{Var}(\text{Im}(x_k(m))) \quad (16)$$

where $\text{Var}(\text{Re}(x_k(m)))=1-(E(\text{Re}(x_k(m))))^2$, and $\text{Var}(\text{Im}(x_k(m)))=1-(E(\text{Im}(x_k(m))))^2$ where $x_k(m)$ represents a data stream of a k-th user, and E( ) represents the mean value, Var( ) represents the variance, and Re represents a real part, Im represents an imaginary part. $e_{DEC}(\text{Re}(x_k(m)))$ represents apriori soft information of the real part of the data stream, $e_{DEC}(\text{Im}(x_k(m)))$ represents apriori soft information of the imaginary part of the data stream, that is, the mean value and the variance of the data stream are acquired according to the apriori soft information of the data stream. The apriori soft information is set to be zero in initial iteration.

After the external soft information of the code chip is calculated by the soft information estimator 201 as described above, the down-sampling module 2021 performs down-sampling on the external soft information to acquire second external soft information $e_{ESE}(x_k(m))$ of the corresponding data stream. The updating module 2022 may be configured to perform de-mapping, de-interleaving and decoding corresponding to the user using the second external soft information to acquire third external soft information, and perform corresponding interleaving and mapping using the third external soft information to acquire updated apriori soft information $e_{DEC}(x_k(m))$ of the data stream corresponding to the user. The updating module 2022 calculates updated apriori statistical information of the data stream using formulas (15) and (16). The up-sampling module 2023 acquires updated apriori statistical information of the code chip using formulas (13) and (14). The soft information estimator 201 calculates the updated external soft information using formulas (8) to (12), so that a new turn of iteration calculation can be performed.

In addition, although down-sampling is performed on the external soft information of the code chip after the external soft information is calculated in the above example, down-sampling may also be performed on the mean value matrix $E(\xi_k)$ and covariance matrix $\text{Cov}(\xi_k)$ of the sum of noise and interference, and second external soft information $e_{ESE}(x_k(m))$ of the data stream may be calculated directly according to the formula (8). It should be understood that calculation results in the two manners are the same with each other, and just calculation amount are different.

The iteration control unit 203 controls the soft information estimator 201 and the updating unit 202 to repeat the above calculation, until a predetermined condition is met. The predetermined condition may refer to for example that a predetermined number of iterations is reached. In a case that the predetermined condition is met, the decision unit 204 performs hard decision based on the external soft information of the code chip at this time. For example, in FIG. 10, the decision unit 204 may perform hard decision on output of the decoder.

In another example, cyclic prefix filter bank multicarrier interleave division multiple access (CP FBMC-IDMA) communication technology is used. The transmitting end includes the apparatus 100 according to the first embodiment, and the receiving end includes the apparatus 200 according to the embodiment. A multiple access channel is provided between the transmitting end and the receiving end. As described above, chip-by-chip detection algorithm is still used by the apparatus 200.

Figure 11:
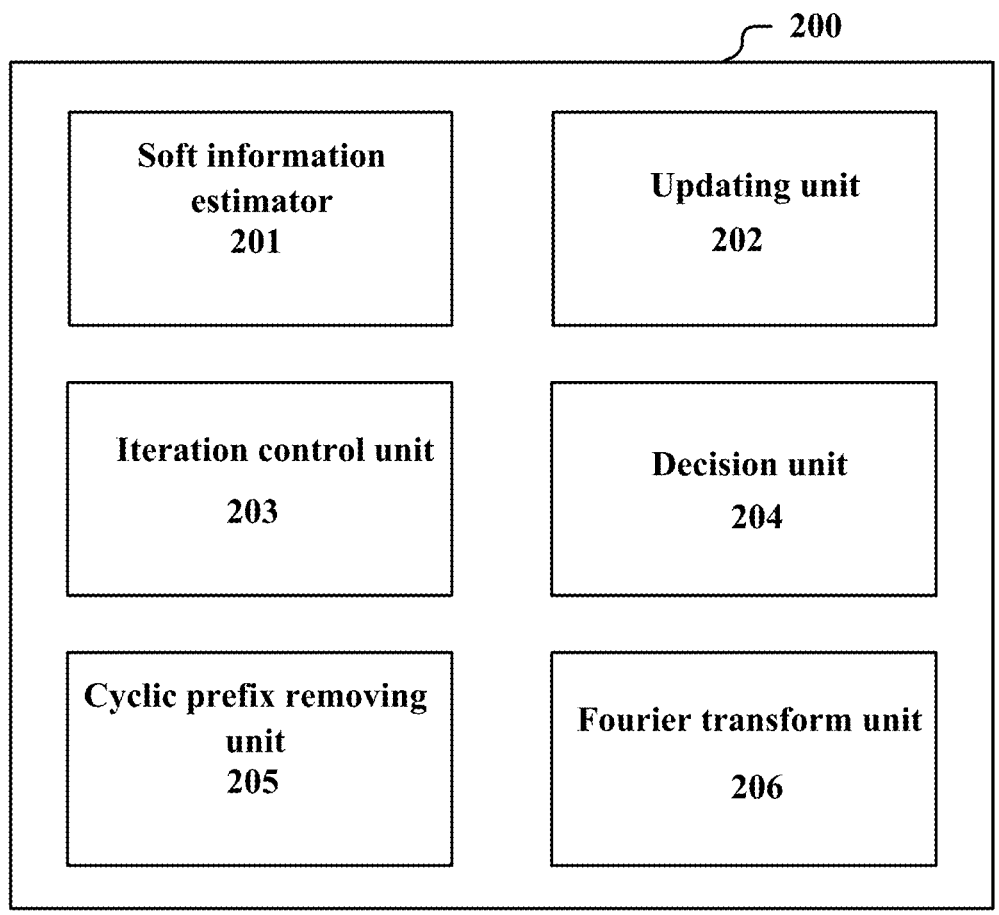
FIG. 11 is another structural block diagram of an apparatus for a receiving end of a wireless communication system according to an embodiment of the present disclosure.

As shown in FIG. 11, in the example, in addition to the units shown in FIG. 8, the apparatus 200 further includes: a cyclic prefix removing unit 205, configured to remove a cyclic prefix in the received data; and a Fourier transform unit 206, configured to perform fast Fourier transform (FFT) on the received data from which the cyclic prefix is removed, and provide the transformed received data to the soft information estimator 201. The Fourier transform unit 206 is further configured to acquire apriori statistical information of the code chip calculated by the updating unit 202, perform FFT on the apriori statistical information to acquire apriori statistical information of the code chip in frequency domain, and provide the apriori statistical information in frequency domain to the soft information estimator 201. The soft information estimator 201 calculates, based on the apriori statistical information of the code chip in frequency domain and the transformed received data, the updated statistical information in frequency domain. The soft information estimator 201 further includes an inverse fast Fourier transform module configured to perform inverse FFT (IFFT) on the updated statistical information in frequency domain to acquire statistical information in time domain. The soft information estimator 201 calculates external soft information based on the statistical information in time domain.

Figure 12:
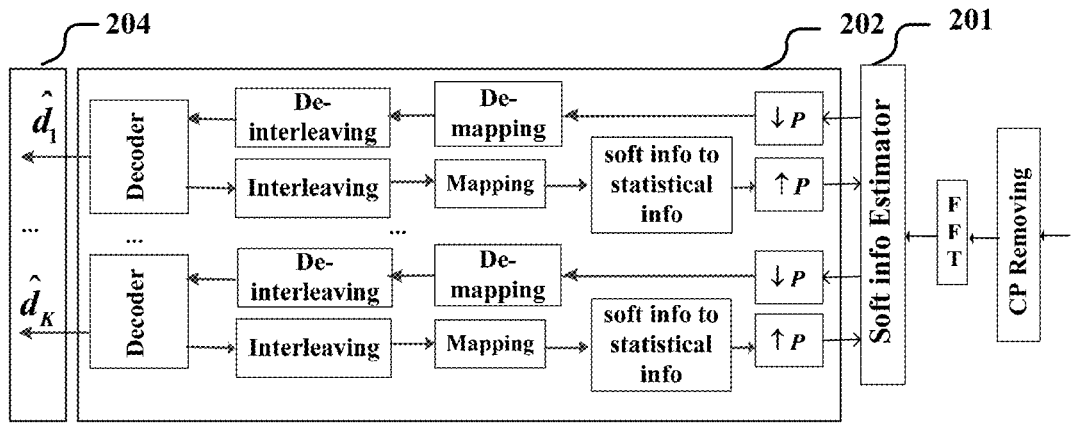
FIG. 12 is another schematic diagram showing receiving processing performed by a receiving end.

FIG. 12 is a schematic diagram showing receiving processing in the example. As is different from the above example, since a cyclic prefix is added, processing of Fourier transform and inverse Fourier transform are added to reduce calculation complexity of the receiving end. The soft information estimator performs processing in the frequency domain.

For example, after a transmitting signal is transmitted through the MAC, a received signal may be represented as follows.

$$r = \sum_{k=1}^{K} H_k \tilde{x}_k + \xi, \quad (17)$$

where $r=[r(1),r(2),\ldots,r(N)]^T$ (18)

$\tilde{x}_k=[\tilde{x}_k(1),\tilde{x}_k(2),\ldots,\tilde{x}_k(N)]^T$ (19)

$\xi=[\xi(1),\xi(2),\ldots,\xi(N)]^T$ (20)

$$H_k = \begin{bmatrix} h_{eq,k}(1) & 0 & \ldots & 0 & h_{eq,k}(l) & \ldots & h_{eq,k}(2) \\ h_{eq,k}(2) & h_{eq,k}(1) & \ldots & 0 & & \ldots & h_{eq,k}(3) \\ \vdots & \vdots & \ddots & 0 & \vdots & \ddots & \vdots \\ h_{eq,k}(l) & h_{eq,k}(l-1) & \ldots & 0 & 0 & \ldots & 0 \\ \vdots & \vdots & \ddots & \ldots & \ldots & \ddots & \vdots \\ 0 & 0 & \ldots & h_{eq,k}(l) & h_{eq,k}(l-1) & \ldots & h_{eq,k}(1) \end{bmatrix} \quad (21)$$

where, similarly, r(j) represents each received symbol data, $\tilde{x}_k(j)$ represents up-sampled data of $x_k(m)$, $x_k(m)$ represents data before the CP is added at the transmitting end, ξ(j) represents additive white Gaussian noise (AWGN), $h_{eq,k}(l)$ represents an equivalent channel synthesized by all sub-carriers selected by the k-th user and the multiple access channel (MAC) of the k-th user, $H_k$ represents a cyclic matrix of N×N composed of $h_{eq,k}(l)$ as a first column. It can be seen that $H_k$ here is different from $H_k$ in the NCP FBMC-IDMA.

Fast Fourier transform (FFT) is performed on the formula (17), to obtain a formula (22) as follows.

$$R = \sum_{k=1}^{K} \Lambda_k X_k + Z, \tag{22}$$

where R, $X_k$ and Z represent signals in frequency domain obtained after subjecting r, $\tilde{x}_k$ and ξ to an FFT operation, respectively, $\Lambda_k = \text{diag}\{\lambda_k(1), \lambda_k(2), \ldots, \lambda_k(N)\}$, $\Lambda_k$ denotes a diagonal matrix by taking $\{\lambda_k(1), \lambda_k(2), \ldots, \lambda_k(N)\}$ as a diagonal element of the matrix, and $\{\lambda_k(1), \lambda_k(2), \ldots, \lambda_k(N)\}$ is a value corresponding to $h_{eq,k}(l)$ obtained after N-point FFT is performed on $h_{eq,k}(l)$.

For each row in the formula (22), a following formula (23) is established.

$$R(n) = \sum_{k=1}^{K} \lambda_k(n) X_k(n) + Z(n), n = 1, 2, \ldots, N \tag{23}$$

where R(n), $\lambda_k(n)$, $X_k(n)$ and Z(n) denote a n-th element of R, $\Lambda_k$, $X_k$ and Z, respectively.

The formula (23) may be also be written as:

$$R(n) = \lambda_k(n) X_k(n) + \eta_k(n), \tag{24}$$

$$\eta_k(n) \equiv R(n) - \lambda_k(n) X_k(n) = \sum_{k' \neq k} \lambda_{k'}(n) X_{k'}(n) + \eta(n) \tag{25}$$

where $\eta_k(n)$ represents a sum of interference and noise corresponding to the k-th user. $\eta_k(n)$ may be approximately represented as a Gaussian variable according to the central limit theorem, and a probability density function (PDF) of the Gaussian variable is determined by its mean value and variance.

In the example, the apriori statistical information is the mean value. The soft information estimator 201 calculates the soft external information as follows: calculating a mean value of a sum of noise and interference based on the mean value of the code chip in frequency domain, to acquire an updated mean value of the code chip in the frequency domain; performing, by the inverse fast Fourier transform module, inverse FFT on the updated mean value in the frequency domain, to obtain a mean value of the code chip in time domain; and calculating the external soft information based on the mean value of the code chip in time domain.

For example, the soft information estimator 201 may calculate the external soft information according to a formula as follows.

$$e_{ESE}(x_k(m)) = \ln\left(\frac{1 + E(x_k(m))}{1 - E(x_k(m))}\right) \tag{26}$$

where $e_{ESE}(x_k(m))$ represents acquired external soft information, $E(x_k(m))$ represents updated statistical information of a data stream calculated based on the received data and the apriori statistical information of the code chip. An updating process is performed in the frequency domain as shown below.

$$E(x_k(m)) = (\text{ifft}(E(X_k(n))))_{\downarrow P} \tag{27}$$

where $\downarrow P$ denotes down-sampling with a down-sampling factor of P, where $$E(X_k(n)) = \frac{E(R(n)) - E(\eta_k(n))}{\lambda_k(n)} \tag{28}$$

where R(n) represents transformed received data, $$E(\eta_k(n)) = \sum_{\substack{k'=1 \\ k' \neq k}}^{K} \lambda_{k'}(n) E(X_{k'}(n)) \tag{29}$$

$E(X_k(n))$ represents a mean value of the code chip in frequency domain, and k' is only used to be distinguished from k. $E(X_k(n))$ may be obtained as follows: the up-sampling module 2023 may perform up-sampling on the mean value of the data stream in time domain, and the Fourier transform unit 206 performs an FFT operation on the up-sampled mean value in time domain, as shown by the following formula for the k-th user.

$$E(X_k(n)) = \text{fft}((E(x_k(m)))_{\uparrow P}) \tag{30}$$

For example, the mean value of the data stream in time domain may be calculated by the updating module 2022 according to a formula as follows.

$$E(x_k(m)) = \text{Re}(E(x_k(m))) + j\text{Im}(E(x_k(m))) = E(\text{Re}(x_k(m))) + jE(\text{Im}(x_k(m))) \tag{31}$$

where $E(\text{Re}(x_k(m))) = \tan h(e_{DEC}(\text{Re}(x_k(m)))/2)$, and $E(\text{Im}(x_k(m))) = \tan h(e_{DEC}(\text{Im}(x_k(m)))/2)$, where $x_k(m)$ represents a data stream of the k-th user, E( ) represents a mean value, Re represents a real part, Im represents an imaginary part, $e_{DEC}(\text{Re}(x_k(m)))$ represents apriori soft information of the real part of the data stream, and $e_{DEC}(\text{Im}(x_k(m)))$ represents apriori soft information of the imaginary part of the data stream. Similarly, an initial value of the apriori soft information is set to be zero in the first iteration.

The external soft information of the data stream is calculated directly according to the above formula (26), since down-sampling is performed during the calculation of the updated statistical information according to the formula (27). However, as shown strictly in the structure in FIG. 12, down-sampling may be not performed in the formula (27), and the down-sampling is performed on the external soft information after the updated statistical information is transformed into the external soft information. In this case, the following formulas (32) and (33) are established.

$$E(\tilde{x}_k(j)) = \textit{ifft}(E(X_k(n))) \quad (32)$$

$$e_{ESE}(x_k(m)) = \left(\ln\left(\frac{1+E(\tilde{x}_k(j))}{1-E(\tilde{x}_k(j))}\right)\right)_{\downarrow P} \quad (33)$$

It should be understood that the two ways produce the same results, and the difference only lies in different calculation amount.

After second external soft information $e_{ESE}(x_k(m))$ (the "second" here is used to be distinguished from the external soft information of the code chip, and is kept consistent with the previous example) of the data stream is acquired by the soft information estimator 201 and the down-sampling module 2021 as described above, the updating module 2022 may be configured to perform de-mapping, de-interleaving and decoding corresponding to the user using the second external soft information to acquire third external soft information, and perform corresponding interleaving and mapping using the third external soft information to acquire the updated apriori soft information $e_{DEC}(x_k(m))$ of the data stream corresponding to the user. Then, the updating module 2022 calculates the updated apriori statistical information of the data stream according to a formula (31). The up-sampling module 2023 and the Fourier transform unit 206 acquire updated apriori statistical information of the code chip in frequency domain according to a formula (30). Next, the soft information estimator 201 and the down-sampling module 2021 calculate the updated external soft information of the data stream in the time domain according to the formulas (26) to (29), to enable performing of a new turn of iteration calculation.

The iteration control unit 203 controls the soft information estimator 201, the Fourier transform unit 206 and the updating unit 202 to repeat the above calculation, until a predetermined condition is met. The predetermined condition may refer to for example that a predetermined number of iterations is reached. In a case that the predetermined condition is met, the decision unit 204 performs hard decision based on the external soft information of the code chip at this time. For example, in FIG. 12, the decision unit 204 may perform hard decision on output of the decoder.

In addition, it should be noted that the Fourier transform unit 206 described here plays two roles. The Fourier transform unit 206 performs FFT on the received data before enters into the iteration operation, and performs FFT on the apriori statistical information in the iteration operation. In practice, two FFT modules may be provided respectively, or one FFT module may be shared. With reference to FIG. 12, it can be understood that the Fourier transform unit 206 configured to perform FFT on the apriori statistical information may be a part of the soft information estimator 201 in function.

The apparatus 200 according to the embodiment estimates soft information of the real part and the imaginary part of the received data with a chip-by-chip detection method, to enable reception of an FBMC-IDMA signal in various modulation formats, thereby resisting external spectrum interference better.

Figure 13:
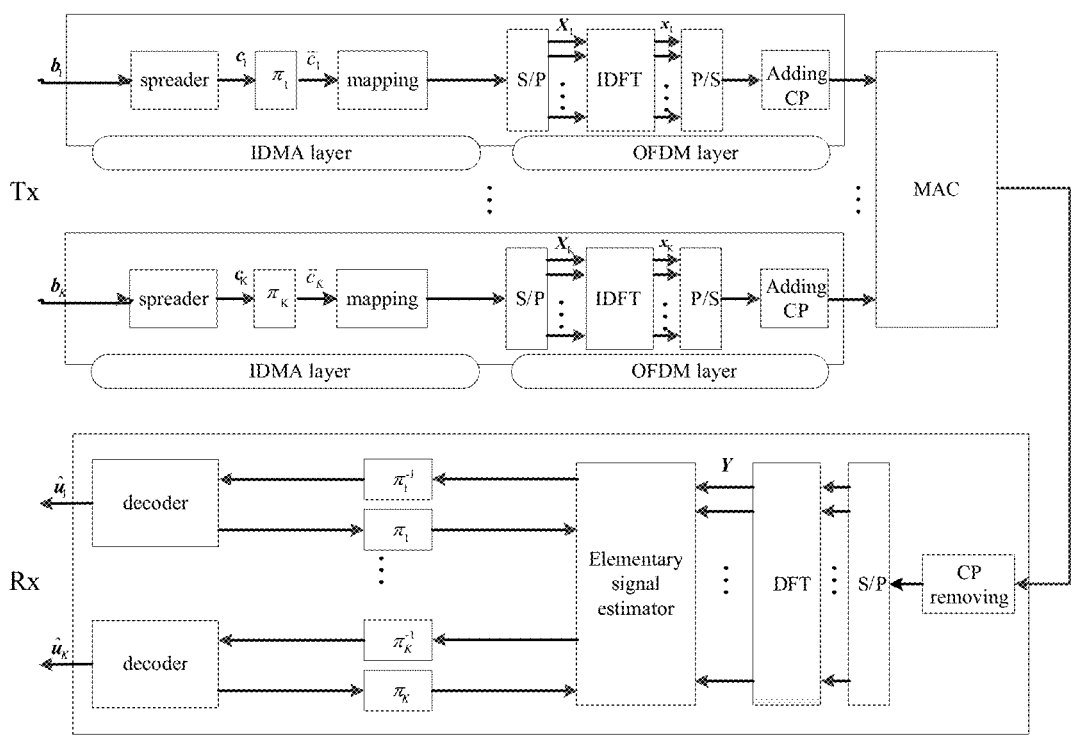
FIG. 13 is a structural block diagram of an orthogonal frequency division multiple-interleave division multiple access (OFDM-IDMA) communication system according to the prior art.

In order to better understand advantages of the FBMC-IDMA communication system in the present disclosure, comparison of performance of the NCP FBMC-IDMA communication system and the CP FBMC-IDMA communication system with performance of an existing OFDM-IDMA communication system is given below by simulation. The NCP FBMC-IDMA communication system includes the transmitting end in FIG. 3, the receiving end in FIG. 10, and an MAC for connecting the transmitting end and the receiving end. The CP FBMC-IDMA communication system includes the transmitting end in FIG. 4, the receiving end in FIG. 12 and an MAC for connecting the transmitting end and the receiving end. Procedures of system signaling of the NCP FBMC-IDMA communication system and the CP FBMC-IDMA communication system are as shown in FIG. 7. A block diagram of the OFDM-IDMA communication system is shown in FIG. 13, each module in which may be implemented by existing technology, and is described briefly below.

At the transmitting end (Tx), a bit vector $b_k$ (the bit vector may be encoded or not) of transmitting information of a k-th user is inputted to an spreader, to obtain a spread code chip vector $c_k$. The spreading sequence is for example an alternate sequence of $\{+1, -1\}$. Then, $c_k$ is inputted to an interleaver $\pi_k$ to be interleaved, to obtain an interleaved code chip vector $\bar{c}_k$. Interleavers of K users must be different from each other, so that the system can distinguish the users from each other. Next, symbol mapping is performed on $\bar{c}_k$, to obtain a data stream $x_k(m)$, k=1, 2, . . . , K. Then, serial/parallel (S/P) transform is performed on the data stream, to perform inverse discrete Fourier transform (IDFT). Parallel/serial (P/S) transform is performed on the transformed data, and a cyclic prefix (CP) is added to obtain the transmitting data. The transmitting data is transmitted to the receiving end through the MAC. At the receiving end, the CP is removed first, and S/P transform and DFT are performed, and finally an elementary signal estimator (ESE) is used to estimate external soft information, which is used for decoding.

Figure 14:
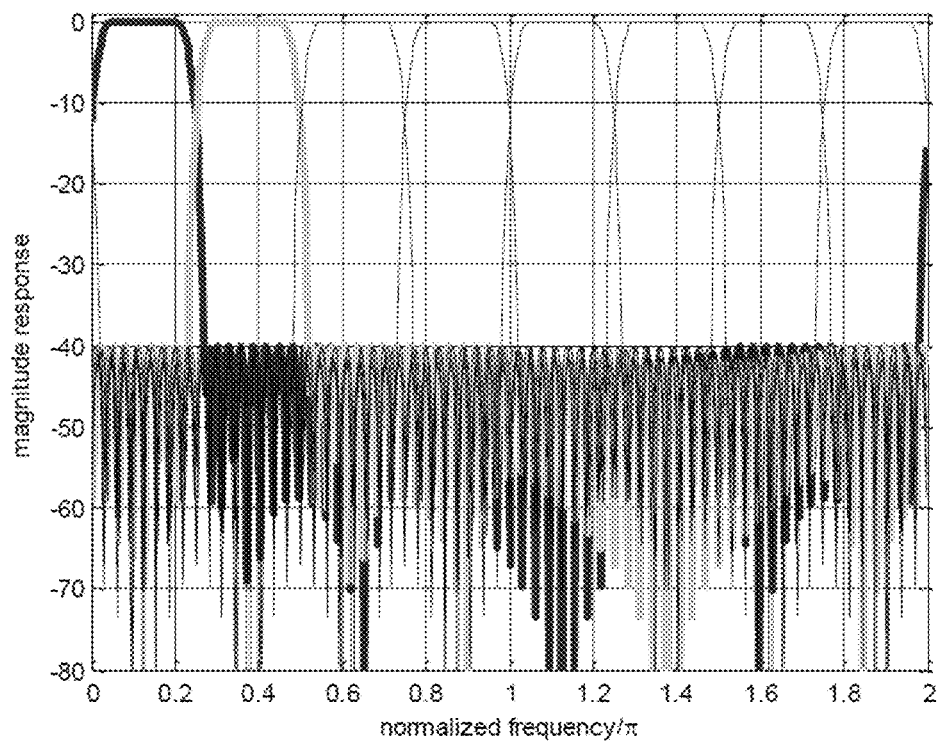
FIG. 14 is a diagram showing an example of a spectrum response of a filter in a filter bank.

Parameters related to the system are described as follows. The number of active users is K=4, the number of sub-carriers is M=8, and a random interleaver is used by each user. A constellation diagram represents QPSK modulation, and a channel is a Rayleigh fading channel having 16 taps. Each user selects D sub-carriers, the number of iterations at a receiver is 12, and the CP length is $N_c$=max $\{\lceil(N_f+L-1)/P\rceil, L\}$=16, a filter in the filter bank in FBMC-IDMA is incomplete reconstruction designed, as shown in FIG. 14. The length of the filter is $N_f$=64, an up-sampling rate of the filter bank is P=8, a spread length in the FBMC-IDMA is S=4, and a spread length of the OFDM-IDMA is S=32.

Figure 15:
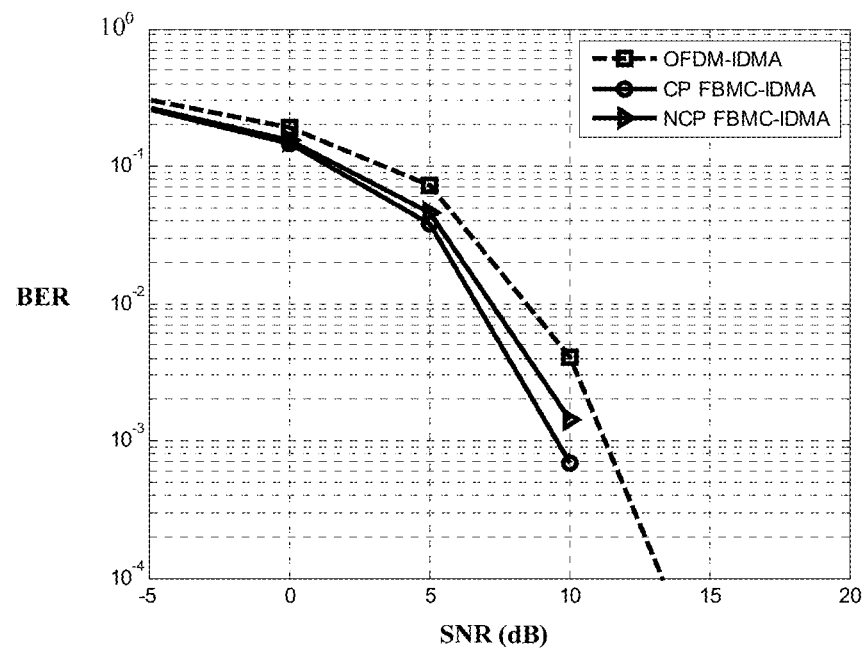
FIG. 15 is a graph showing a change of a bit error rate (BER) in three communication systems with a signal to noise ratio in a case of the number of sub-carriers being 3.
Figure 16:
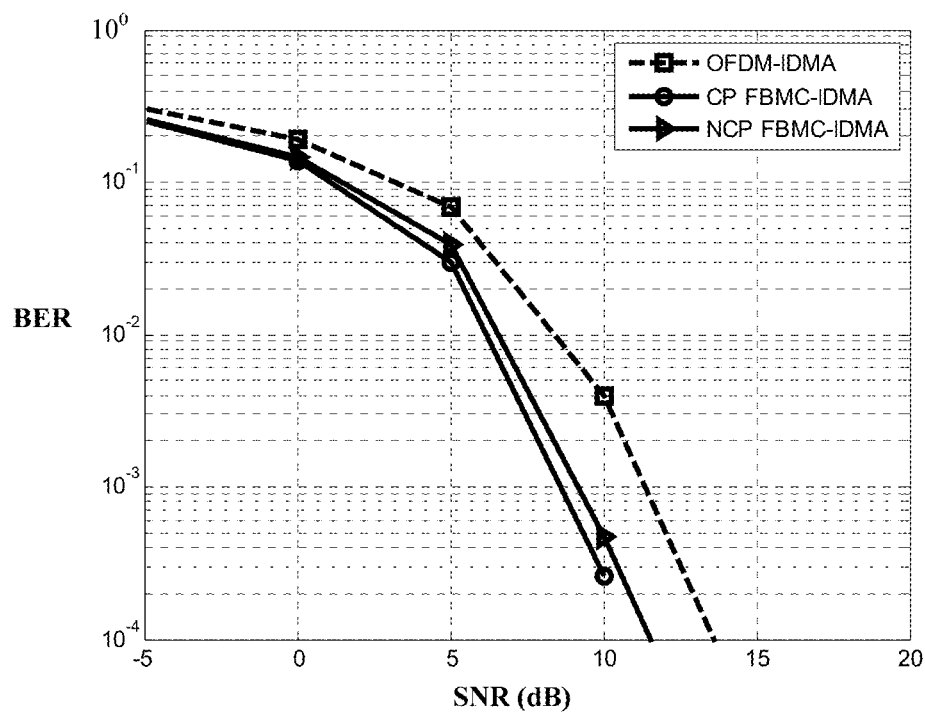
FIG. 16 is a graph showing a change of a bit error rate (BER) in three communication systems with a signal to noise ratio in a case of the number of sub-carriers being 5.
Figure 17:
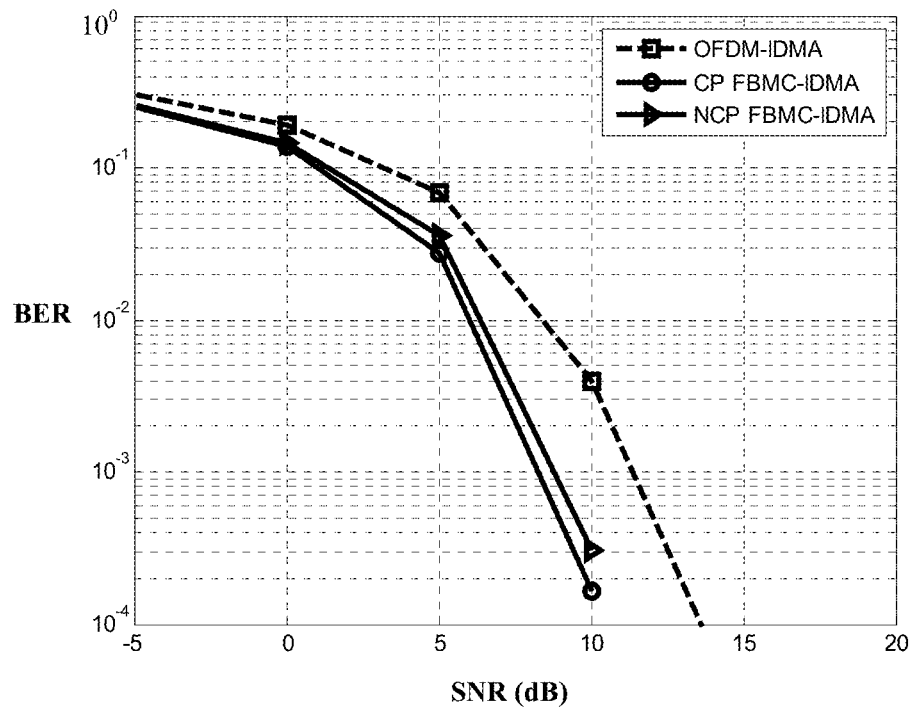
FIG. 17 is a graph showing a change of a bit error rate (BER) in three communication systems with a signal to noise ratio in a case of the number of sub-carriers being 7.

FIG. 15 to FIG. 17 show comparison of changes of bit error rates (BERs) in three systems with a signal to noise ratio (SNR) in cases that the user selects 3 sub-carriers, 5 sub-carriers and 7 sub-carriers respectively. It can be seen that, in the three cases, under a condition of the same SNR, the CP FBMC-IDMA has the optimal performance, the NCP FBMC-IDMA has intermediate performance, and the OFDM-IDMA has the poorest performance. With an increase in the SNR, improvement of the system performance of FBMC-IDMA is more significant, which proves the improvement to the system performance produced by the FBMC-IDMA communication system in the present disclosure.

Third Embodiment

A soft information estimator is provided according to the embodiment. The soft information estimator is configured to calculate, based on received data and apriori statistical information of a real part and an imaginary part of each group of code chip for each user, external soft information of the real part and the imaginary part of the code chip respectively, wherein, the apriori statistical information is acquired based on apriori soft information of the code chip and an initial value of the apriori soft information is 0.

The soft information estimator performs processing chip-by-chip, and estimates for a real part and an imaginary part of received data respectively. The soft information estimator may be applied to various modulation formats such as BPSK, QPSK, QAM and the like. The soft information represents a probability that the received data is determined as different transmitting values.

The soft information estimator may be applied to for example the FBMC-IDMA communication systems according to the first embodiment and the second embodiment. Operations of the soft information estimator are different for the NCP-FBMC-IDMA communication system and the CP-FBMC-IDMA communication system, detailed description of which may be found in the second embodiment, and is not described repeatedly here anymore.

Fourth Embodiment

In the process of describing the apparatuses for a transmitting end and a receiving end of wireless communication system and the soft information estimator in the embodiments described above, obviously, some processing and methods are also disclosed. Hereinafter, an overview of the methods is given without repeating some details disclosed above. However, it should be noted that, although the methods are disclosed in a process of describing the apparatuses for a transmitting end and a receiving end of wireless communication system and the soft information estimator, the methods do not certainly employ or are not certainly executed by the aforementioned components. For example, the embodiments of the above apparatus may be partially or completely implemented with hardware and/or firmware, the methods described below may be executed by a computer-executable program completely, although the hardware and/or firmware of the above apparatus can also be used in the methods.

Figure 18:
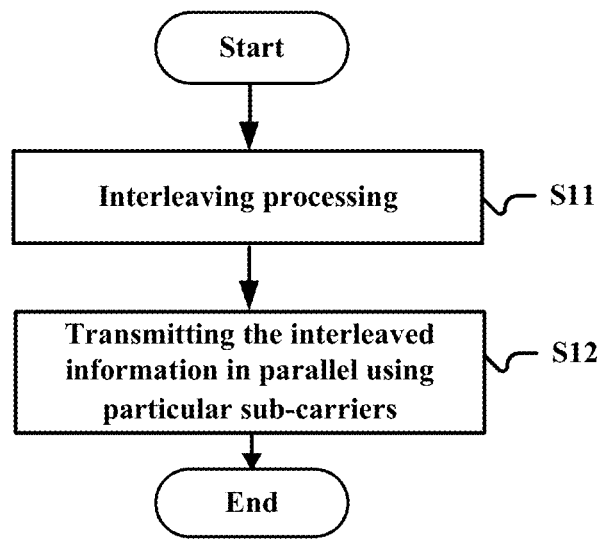
FIG. 18 is a flowchart of a method for a transmitting end of a wireless communication system according to an embodiment of the present disclosure.

FIG. 18 is a flowchart of a method for a transmitting end of a wireless communication system according to an embodiment of the present disclosure, the method includes: performing interleaving processing on information to be transmitted (S11); and transmitting the interleaved information in parallel using particular preselected sub-carriers (S12).

In an example, the above step S12 may further include performing up-sampling on the interleaved information, inputting the up-sampled information to filters corresponding to the sub-carriers, and combining output of the filters for transmitting. A cyclic prefix may also be inserted into the interleaved information before the up-sampling is performed on the interleaved information.

The above method may be executed by user equipment. In this case, the above method may further include receiving information as to whether a cyclic prefix is to be used and/or information about the number N of the sub-carriers to be selected, from a base station. Correspondingly, the above method may further include randomly selecting N sub-carriers as the particular sub-carriers. In addition, information related to a data length and the filter bank may also be received from the base station, so that the user equipment performs data packeting and filter generation based on the related information.

In another aspect, the above method may be executed by the base station. In this case, the above method may further include determining whether to use a cyclic prefix and the number of sub-carriers to be used based on a result of channel estimation.

In addition, the base station may receive a training sequence and a quality of service requirement from the user equipment, so that the base station performs channel estimation based on the training sequence and the quality of service requirement, and transmit information as to whether to use a cyclic prefix and/or the number of sub-carriers to be used to the user equipment. The above method may further include transmitting information related to a data length and the filter bank to the user equipment upon receiving a data transmission request from the user equipment. The information related to the filter bank includes for example at least one of the number of sub-carriers, a length of the filter, a center frequency and a bandwidth.

Figure 19:
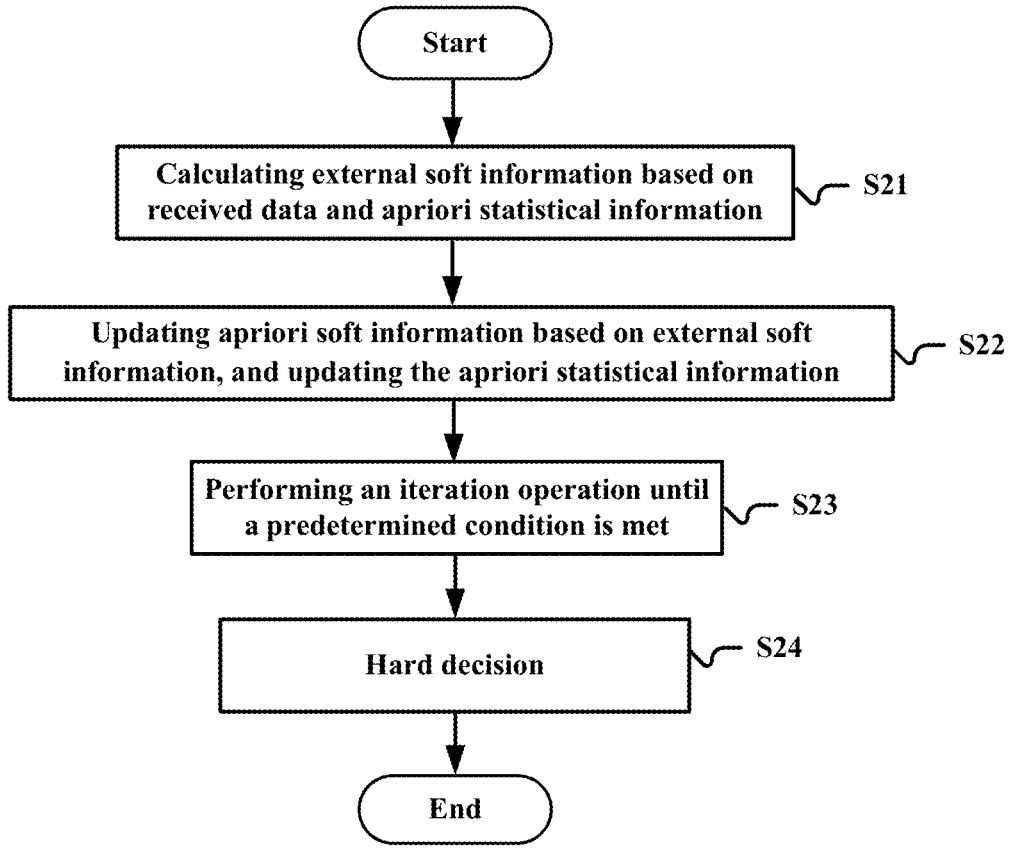
FIG. 19 is a flowchart of a method for a receiving end of a wireless communication system according to an embodiment of the present disclosure.

FIG. 19 is a flowchart of a method for a receiving end of a wireless communication system according to an embodiment of the present disclosure. The method includes: calculating, based on received data and apriori statistical information of a real part and an imaginary part of each group of code chip for each user, external soft information of the real part and the imaginary part of the code chip respectively (S21), wherein, the apriori statistical information is acquired based on apriori soft information of the code chip and an initial value of the apriori soft information is 0; updating, based on the external soft information, the apriori soft information corresponding to the code chip of the user, and updating, based on the updated apriori soft information, the apriori statistical information corresponding to the code chip of the user (S22); performing iteration operation on the above mentioned processing S21 and S22, until a predetermined condition is satisfied (S23); and performing hard decision based on the external soft information of the code chip in the case of satisfying the predetermined condition (S24).

The predetermined condition refers to for example that a predetermined number of iterations is reached.

Since up-sampling is performed at the transmitting end, the step S22 may further include: performing down-sampling on the external soft information to obtain second external soft information of a data stream corresponding to the user, updating the apriori soft information of the data stream corresponding to the user using the second external soft information, and calculating apriori statistical information of the data stream corresponding to the user based on the updated apriori soft information; and performing up-sampling on the updated apriori statistical information to obtain apriori statistical information of the code chip.

For example, the apriori soft information of the data stream corresponding to the user may be updated by: performing de-mapping, de-interleaving and decoding corresponding to the user using the second external soft information to acquire third external soft information; and performing interleaving and mapping using the third external soft information to acquire the updated apriori soft information.

In an example, in the NCP FBMC-IDMA communication system, the apriori statistical information includes a mean value and variance. Step S21 includes: calculating a mean value matrix and a covariance matrix of a sum of interference and noise based on the mean value and the variance of the code chip, to obtain the external soft information of the code chip. Formulas are given in detail in the second embodiment, and are not repeated here anymore.

In another example, in a case that a cyclic prefix is inserted into the transmitting data, for example in the CP FBMC-IDMA communication system, although not shown in FIG. 19, the above method may further include the following steps before step S21: removing the cyclic prefix in the received data, and performing FFT on the received data from which the cyclic prefix is removed, and providing the transformed received data as the received data in step S21. In the example, in step S21, the external soft information is calculated in frequency domain. Specifically, updated statistical information in frequency domain is calculated based on the apriori statistical information of the code chip in frequency domain and the transformed receiving data; inverse fast Fourier transform (IFFT) is performed on the updated statistical information in frequency domain, to obtain statistical information in time domain; and the external soft information is calculated based on the statistical information in time domain. The apriori statistical information of the code chip in frequency domain is acquired by performing FFT on the up-sampled apriori statistical information of the data stream in time domain.

In the example, the apriori statistical information includes a mean value. A mean value of a sum of interference and noise is calculated based on the mean value of the code chip in frequency domain, to obtain an updated mean value of the code chip in frequency domain. IFFT is performed on the updated mean value in frequency domain to obtain a mean value in time frequency. The external soft information is calculated using the mean value of the code chip in time domain. Formulas are given in detail in the second embodiment, and are not repeated here anymore.

In the description with reference to FIG. 18 and FIG. 19, a soft information estimating method is further provided, which includes: calculating, based on received data and apriori statistical information of a real part and an imaginary part of each group of code chip for each user, external soft information of the real part and the imaginary part of the code chip respectively, wherein, the apriori statistical information is acquired based on apriori soft information of the code chip and an initial value of the apriori soft information is 0.

It is to be noted that, the above methods can be used separately or in conjunction with each other. The details have been described in detail in the first to third embodiments, and are not repeatedly described here.

The basic principle of the present invention has been described above in conjunction with particular embodiments. However, as can be appreciated by those ordinarily skilled in the art, all or any of the steps or components of the method and device according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

It can be understood by those skilled in the art that, the interleave division multiple access unit, the filter bank multi-carrier unit, the determining unit, the selecting unit, the soft information estimator, the updating unit, the iteration control unit, the decision unit or the like in the above apparatus may be implemented by one or more processors, and a transceiving unit or the like in the above apparatus may be implemented by circuit components such as an antenna, a filter, a modem, and a codec.

Therefore, an electronic device (1) is further provided in the present disclosure, which includes a circuit configured to: perform interleaving processing on information to be transmitted; and transmit interleaved information in parallel using particular preselected sub-carriers.

An electronic device (2) is further provided in the present disclosure, which includes a circuit configured to: calculate, based on received data and apriori statistical information of a real part and an imaginary part of each group of code chip for each user, external soft information of the real part and the imaginary part of the code chip respectively, where the apriori statistical information is acquired based on apriori soft information of the code chip, and an initial value of the apriori soft information is zero; update, based on the external soft information, the apriori soft information of a code chip corresponding to the user, and update, based on the updated apriori soft information, the apriori statistical information of the code chip corresponding to the user; perform an iteration operation on the above processing until a predetermined condition is met; and perform hard decision based on the external soft information of the code chip in a case that the predetermined condition is met.

An electronic device (3) is further provided in the present disclosure, which includes a circuit configured to calculate, based on received data and apriori statistical information of a real part and an imaginary part of each group of code chip for each user, external soft information of the real part and the imaginary part of the code chip respectively, wherein, the apriori statistical information is acquired based on apriori soft information of the code chip, and an initial value of the apriori soft information is zero.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2000 shown in FIG. 20) from a storage medium or network, wherein the computer is capable of implementing various functions when installed with various programs.

Figure 20:
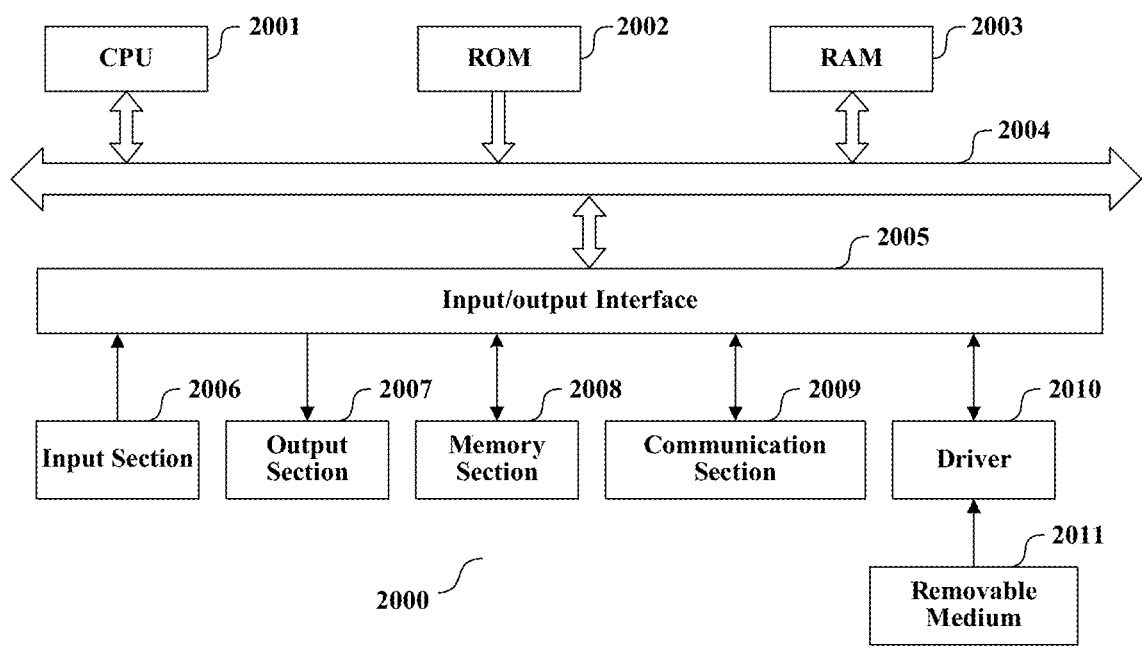
FIG. 20 is a block diagram of an exemplary block diagram illustrating the structure of a general purpose personal computer capable of realizing the method and/or device and/or system according to the embodiments of the present invention.

In FIG. 20, a central processing unit (CPU) 2001 executes various processing according to a program stored in a read-only memory (ROM) 2002 or a program loaded to a random access memory (RAM) 2003 from a memory section 2008. The data needed for the various processing of the CPU 2001 may be stored in the RAM 2003 as needed. The CPU 2001, the ROM 2002 and the RAM 2003 are linked with each other via a bus 2004. An input/output interface 2005 is also linked to the bus 2004.

The following components are linked to the input/output interface 2005: an input section 2006 (including keyboard, mouse and the like), an output section 2007 (including displays such as a cathode ray tube (CRT), a liquid crystal display (LCD), a loudspeaker and the like), a memory section 2008 (including hard disc and the like), and a communication section 2009 (including a network interface card such as a LAN card, a modem and the like). The communication section 2009 performs communication processing via a network such as the Internet. A driver 2010 may also be linked to the input/output interface 2005 if needed. If needed, a removable medium 2011, for example, a magnetic disc, an optical disc, a magnetic optical disc, a semiconductor memory and the like, may be installed in the driver 2010, so that the computer program read therefrom is installed in the memory section 2008 as appropriate.

In the case where the foregoing series of processing is achieved by software, programs forming the software are installed from a network such as the Internet or a memory medium such as the removable medium 2011.

It should be appreciated by those skilled in the art that the memory medium is not limited to the removable medium 2011 shown in FIG. 20, which has program stored therein and is distributed separately from the apparatus so as to provide the programs to users. The removable medium 2011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2002 and the memory section 2008 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent schemes of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for a transmitting end of a wireless communication system, comprising:
   an interleave division multiple access unit, configured to perform interleaving processing on information to be transmitted; and
   a filter bank multi-carrier unit, configured to transmit the interleaved information in parallel using particular preselected sub-carriers, comprising
      an up-sampling module configured to perform up-sampling on the interleaved information,
      a filter bank comprising a plurality of filters, each of which corresponds to a sub-carrier, wherein the up-sampled user information is inputted to one or more filters corresponding to the particular preselected sub-carriers,
      a combining module configured to combine output of the one or more filters for transmitting, and
      a cyclic prefix module configured to insert a cyclic prefix into the interleaved information before the up-sampling is performed on the interleaved information.

2. The apparatus according to claim 1, wherein the transmitting end is user equipment, and the apparatus further comprises a transceiving unit configured to receive, from a base station, information as to whether a cyclic prefix is to be used and/or information about the number N of the sub-carriers to be selected.

3. The apparatus according to claim 2, wherein the transceiving unit is further configured to receive, from the base station, information related to a data length and the filter bank, so that the user equipment performs data packeting and filter generation based on the related information.

4. The apparatus according to claim 2, wherein the apparatus further comprises a selecting unit configured to randomly select N sub-carriers as the particular sub-carriers.

5. The apparatus according to claim 1, wherein the transmitting end is a base station, and the apparatus further comprises a determining unit configured to determine, based on a result of channel estimation, whether to use a cyclic prefix and the number of sub-carriers to be used by user equipment.

6. The apparatus according to claim 5, further comprising:
   a transceiving unit, configured to receive, from the user equipment, a training sequence and a quality of service requirement, so that the base station performs channel estimation based on the training sequence and the quality of service requirement, and transmits information as to whether to use a cyclic prefix and/or the number of sub-carriers to be selected to the user equipment.

7. The apparatus according to claim 6, wherein the transceiving unit is further configured to, upon receiving a data transmitting request from the user equipment, transmit information related to a data length and a filter bank to the user equipment.

8. The apparatus according to claim 7, wherein the information related to the filter bank comprises at least one of the number of sub-carriers, a length of the filter, a center frequency, and a bandwidth.

9. A method for a transmitting end of a wireless communication system, comprising:
   performing interleaving processing on information to be transmitted;
   inserting a cyclic prefix into the interleaved information before up-sampling is performed on the interleaved information;
   performing up-sampling on the interleaved information;
   inputting the up-sampled interleaved information to one or more filters of a filter bank corresponding to particular preselected sub-carriers, the filter bank including a plurality of filters, each of the plurality of filters corresponding to a sub-carrier of a plurality of sub-carriers;
   combining output of the one or more filters for transmitting; and
   transmitting the interleaved information in parallel using the particular pre-selected sub-carriers.

10. An apparatus for a transmitting end of a wireless communication system, comprising:
    circuitry configured to
    perform interleaving processing on information to be transmitted;

insert a cyclic prefix into the interleaved information before up-sampling is performed on the interleaved information;

perform up-sampling on the interleaved information;

input the up-sampled interleaved information to one or more filters of a filter bank corresponding to particular preselected sub-carriers, the filter bank including a plurality of filters, each of the plurality of filters corresponding to a sub-carrier of a plurality of sub-carriers;

combine output of the one or more filters for transmitting; and transmit the interleaved information in parallel, using the particular pre-selected sub-carriers.

11. The apparatus according to claim 10, wherein the transmitting end is user equipment, and the circuitry is further configured to receive, from a base station, information as to whether a cyclic prefix is to be used and/or information about the number N of the sub-carriers to be selected.

12. The apparatus according to claim 11, wherein the circuitry is further configured to receive, from the base station, information related to a data length and the filter bank, so that the user equipment performs data packeting and filter generation based on the related information.

13. The apparatus according to claim 11, wherein the circuitry is further configured to randomly select N sub-carriers as the particular sub-carriers.

14. The apparatus according to claim 10, wherein the transmitting end is a base station, and the circuitry is further configured to determine, based on a result of channel estimation, whether to use a cyclic prefix and the number of sub-carriers to be used by user equipment.

15. The apparatus according to claim 14, wherein the circuitry is further configured to receive, from the user equipment, a training sequence and a quality of service requirement, so that the base station performs channel estimation based on the training sequence and the quality of service requirement, and transmits information as to whether to use a cyclic prefix and/or the number of sub-carriers to be selected to the user equipment.

16. The apparatus according to claim 15, wherein the circuitry is further configured to, upon receiving a data transmitting request from the user equipment, transmit information related to a data length and a filter bank to the user equipment.

17. The apparatus according to claim 16, wherein the information related to the filter bank comprises at least one of the number of sub-carriers, a length of the filter, a center frequency, and a bandwidth.

* * * * *